US009719732B2

(12) United States Patent
Ota et al.

(10) Patent No.: US 9,719,732 B2
(45) Date of Patent: Aug. 1, 2017

(54) COLD STORAGE HEAT EXCHANGER (71) Applicant: DENSO CORPORATION, Kariya, Aichi-pref. (JP)

(72) Inventors: Aun Ota, Okazaki (JP); Daisuke Haseba, Okazaki (JP); Jun Abei, Obu (JP); Yuusuke Kitoh, Chiryu (JP); Eiichi Torigoe, Anjo (JP); Toshiya Nagasawa, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 271 days.

(21) Appl. No.: 14/421,945

(22) PCT Filed: Aug. 1, 2013

(86) PCT No.: PCT/JP2013/004663
§ 371 (c)(1),
(2) Date: Feb. 16, 2015

(87) PCT Pub. No.: WO2014/030306
PCT Pub. Date: Feb. 27, 2014

(65) Prior Publication Data
US 2015/0211806 A1  Jul. 30, 2015

(30) Foreign Application Priority Data

Aug. 22, 2012  (JP) .................. 2012-183201

(51) Int. Cl.
*F28D 17/00*  (2006.01)
*F28D 19/00*  (2006.01)
(Continued)

(52) U.S. Cl.
CPC ......... *F28D 20/00* (2013.01); *F28D 1/05366* (2013.01); *F28D 20/02* (2013.01);
(Continued)

(58) Field of Classification Search
CPC ........ F28D 20/00; F28D 20/02; F28D 1/0536; F28D 2021/0085; F28D 2020/0013; Y02E 60/145
See application file for complete search history.

(56) References Cited

U.S. PATENT DOCUMENTS 6,701,731 B2 * 3/2004 Aikawa ................. B60H 1/005
62/225
6,708,512 B2 * 3/2004 Kitamura ............... B60H 1/005
62/227
(Continued)

FOREIGN PATENT DOCUMENTS

DE  102004035818 A1  3/2006
JP  2002-274165  9/2002
(Continued)

OTHER PUBLICATIONS

Office Action mailed Jun. 30, 2015 in the corresponding Japanese application No. 2012-183201 with English translation.
(Continued)

*Primary Examiner* — Ljiljana Ciric
(74) *Attorney, Agent, or Firm* — Harness, Dickey & Pierce, P.L.C.

(57) ABSTRACT

A cold storage heat exchanger has refrigerant pipes and a cold storage material. Each of the refrigerant pipes has a refrigerant passage therein. The refrigerant pipes are arranged so as to be distanced from each other with clearances therebetween. The cold storage material is disposed in at least one of the clearances. At least another one of the clearances provides an air passage. The heat storage material is disposed in at least two of the clearances arranged adjacent to each other.

8 Claims, 7 Drawing Sheets

(51) Int. Cl.
*F28D 20/00* (2006.01)
*F28D 20/02* (2006.01)
*F28D 1/053* (2006.01)
*F28D 21/00* (2006.01)

(52) U.S. Cl.
CPC ........... *F28D 2020/0013* (2013.01); *F28D 2021/0085* (2013.01); *Y02E 60/145* (2013.01)

(56) References Cited

U.S. PATENT DOCUMENTS

| | | | |
|---|---|---|---|
| 6,854,286 | B2 | 2/2005 | Bureau et al. |
| 9,555,687 | B2 * | 1/2017 | Lim .................. B60H 1/005 |
| 2002/0088246 | A1 | 7/2002 | Bureau et al. |
| 2002/0088248 | A1 | 7/2002 | Bureau et al. |
| 2004/0093889 | A1 | 5/2004 | Bureau et al. |
| 2010/0018231 | A1 | 1/2010 | Haller et al. |
| 2010/0065244 | A1 | 3/2010 | Yokoyama et al. |
| 2010/0307180 | A1 | 12/2010 | Yamada et al. |
| 2011/0239696 | A1 | 10/2011 | Takagi |
| 2012/0042687 | A1 | 2/2012 | Kamoshida et al. |

FOREIGN PATENT DOCUMENTS

| | | |
|---|---|---|
| JP | 2008522133 A | 6/2008 |
| JP | 2010030490 A | 2/2010 |
| JP | 2010070071 A | 4/2010 |
| JP | 2010091250 A | 4/2010 |
| JP | 2010112670 A | 5/2010 |
| JP | 2010126026 A | 6/2010 |
| JP | 2010139201 A | 6/2010 |
| JP | 2010149814 A | 7/2010 |
| JP | 2011012947 A | 1/2011 |
| JP | 2012042167 A | 3/2012 |
| JP | 2012154595 A | 8/2012 |

OTHER PUBLICATIONS

International Search Report and Written Opinion (in Japanese with English Translation) for PCT/JP2013/004663, mailed Aug. 27, 2013; ISA/JP.

* cited by examiner

COMPARATIVE EXAMPLE

FIG. 11

COLD STORAGE HEAT EXCHANGER

CROSS REFERENCE TO RELATED APPLICATIONS

This application is a U.S. National Phase Application under 35 U.S.C. 371 of International Application No. PCT/JP2013/004663 filed on Aug. 1, 2013 and published in Japanese as WO 2014/030306 A1 on Feb. 27, 2014. This application is based on and claims the benefit of priority from Japanese Patent Applications No. 2012-183201 filed on Aug. 22, 2012. The entire disclosures of all of the above applications are incorporated herein by reference.

TECHNICAL FIELD

The present disclosure relates to a cold storage heat exchanger for a refrigerant cycle device.

BACKGROUND OF ART

A cold storage heat exchanger is described in Patent Document 1. In the cold storage heat exchanger, a refrigerant pipe having a refrigerant passage therein, a fin promoting a heat exchange between air and refrigerant, and a cold storage material case filled with a cold storage material are arranged in a following order of the fin, the refrigerant pipe, the cold storage material, the refrigerant pipe, and the fin. That is, in the cold storage heat exchanger, the refrigerant pipe being in contact with the cold storage material case has a side to which the cold storage material is placed and an other side forming an air passage in a stacking direction of the refrigerant pipes.

Furthermore, in the cold storage heat exchanger, a refrigerant pipe pitch between the refrigerant pipes adjacent to each other is fixed among all refrigerant pipes. Incidentally, the refrigerant pipe pitch is a distance from a center of one refrigerant pipe to a center of another refrigerant pipe.

PRIOR ART DOCUMENT

Patent Document

Patent Document 1: JP-2010-091250 A

SUMMARY OF INVENTION

According to studies of inventors of the present disclosure, regarding the conventional cold storage heat exchanger, an amount of heat of refrigerant transfers to an air side and a cold storage material side in a cold storage since all of the refrigerant pipe being in contact with the cold storage material case has the side to which the cold storage material is placed, and the other side forming the air passage, in the stacking direction of the refrigerant pipes. Accordingly, there is a possibility that a cold storage duration extends. It is required for the above conventional cold storage heat exchanger to shorten the cold storage duration.

In view of the above points, it is an object of the present disclosure to provide a cold storage heat exchanger with which a cold storage duration can be shortened.

According to a first aspect of the present disclosure, a cold storage heat exchanger has: refrigerant pipes each of which has a refrigerant passage therein, the refrigerant pipes arranged to be distanced from each other with clearances therebetween; and a cold storage material disposed in at least one of the clearances. At least an another one of the clearances provides an air passage. The heat storage material is disposed in at least two of the clearances arranged adjacent to each other.

According to the first aspect, a refrigerant pipe of which both sides in a stacking direction of the refrigerant pipes provides a housing part housing the cold storage material. Thus, since cold is not transferred from refrigerant to air in a cold recovery of the refrigerant pipe, a supply amount of cold supplied from refrigerant to the cold storage material can be increased as compared to a case that one of the both sides of the refrigerant pipe is the air passage. As a result, a cold storage duration can be shortened.

According to a second aspect of the present disclosure, a cold storage heat exchanger has: refrigerant pipes each of which therein has a refrigerant passage, the refrigerant pipes arranged to be distanced from each other with clearances; and a cold storage material disposed in at least one of the clearances. At least an another one of the clearances provides an air passage. When a distance from a center of one of the refrigerant pipes to a center of another one of the refrigerant pipes is defined as a refrigerant pipe pitch, a refrigerant pipe pitch between two of the refrigerant pipes that are adjacent to each other and therebetween have the cold storage material is shorter than a refrigerant pipe pitch between two of the refrigerant pipes that are adjacent to each other and therebetween have the air passage.

According to the second aspect, a cold traveling distance from an outer surface of the refrigerant pipe to a center of the cold storage material is shortened, and a distance traveled by cold transferring from refrigerant to the cold storage material is shortened, as compared to a case that a refrigerant pipe pitch between the refrigerant pipes adjacent to each other is fixed among all of the refrigerant pipes in the evaporator. As a result, a cold storage duration can be shortened.

According to a third aspect of the present disclosure, a cold storage heat exchanger has: refrigerant pipes each of which therein has a refrigerant passage, the refrigerant pipes are arranged to be distanced from each other; and a heat storage material arranged between the refrigerant pipes adjacent to each other. When a distance from a center of one of the refrigerant pipes to a center of another one of the refrigerant pipes is defined as a refrigerant pipe pitch: the refrigerant pipes includes first refrigerant pipes that are arranged one after another to be a first refrigerant pipe pitch away from each other; and the refrigerant pipes includes more than or equal to one of the second refrigerant pipe that is arranged between a pair of the first refrigerant pipes adjacent to each other such that the second refrigerant pipe and the pair of the first refrigerant pipes are arranged to be a second refrigerant pipe pitch that is shorter than the first refrigerant pitch away from each other. An air passage is defined between an another pair of the first refrigerant pipes adjacent to each other. The cold storage material is disposed between the second refrigerant pipe and two refrigerant pipes that are located on both sides of the second refrigerant pipe, and the second refrigerant pipe is located between the cold storage materials.

The two refrigerant pipes located between the second refrigerant pipes are the first refrigerant pipes when one second refrigerant pipe is located between the first refrigerant pipes adjacent to each other. The two refrigerant pipes located between the second refrigerant pipes are the first refrigerant pipes or the second refrigerant pipes when the number of the second refrigerant pipes located between the first refrigerant pipes adjacent to each other is more than or equal to two.

According to the third aspect, since the cold storage materials are located on both sides of the second refrigerant pipe, cold is not transferred from refrigerant to air in a cold recovery. Therefore, a supply amount of cold supplied from refrigerant to the cold storage material can be increased as compared to a case that the refrigerant pipes include only the first refrigerant pipes of the first and second refrigerant pipes, the cold storage material is located on one side of the first refrigerant pipe, and the air passage is provided at an other side of the first refrigerant pipe.

According to the third aspect, the second refrigerant pipe is located between the first refrigerant pipes adjacent to each other, and the cold storage material is located between the second refrigerant pipe and the refrigerant pipes that are located on both sides of the second refrigerant pipe. Therefore, a distance from an outer surface of the refrigerant pipes to a center of the cold storage material is shortened, and a cold traveling distance from refrigerant to the cold storage material is shortened, as compared to a cold storage heat exchanger in which the refrigerant pipes include only the first refrigerant pipes of the first and second refrigerant pipes, and the cold storage material is located between the first refrigerant pipes.

Moreover, according to the third aspect, since the second refrigerant pipe is further disposed as compared to the cold storage heat exchanger in which the refrigerant pipes include only the first refrigerant pipes and the cold storage material is disposed between the first refrigerant pipes, a cross sectional area of whole of the refrigerant passages increases. Therefore, since a pressure loss of refrigerant in the refrigerant passage is reduced, and an evaporating temperature of the refrigerant decreases, a temperature difference between the refrigerant and the cold storage material in the cold recovery increases, and an amount of cold transferring from the refrigerant to the cold storage material increases Furthermore, according to the third aspect, since the second refrigerant pipe is located between the first refrigerant pipes adjacent to each other on a condition that the second refrigerant pipe is located between the cold storage materials, a contacting area between the cold storage material and the refrigerant pipes per volume increases, as compared to the cold storage heat exchanger in which the cold storage material is located between the first refrigerant pipes. Accordingly, the supply amount of cold supplied from the refrigerant to the cold storage material increases.

It can be understood easily that the contacting area between the cold storage material and the refrigerant pipes per volume of the cold storage material increases, by conducting the above comparison under a presumption that a volume of the cold storage material located between the first refrigerant pipes are uniform.

As a result of the above features, the cold storage duration can be shortened according to the above third aspect.

DESCRIPTION OF EMBODIMENTS

Embodiments of the present disclosure will be described hereafter referring to drawings. In the embodiments, a part that corresponds to a matter described in a preceding embodiment may be assigned with the same reference number, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

In the present embodiment, a cold storage heat exchanger of the present disclosure is used for an evaporator constituting a refrigerant cycle device of a vehicle air conditioner.

Figure 1:
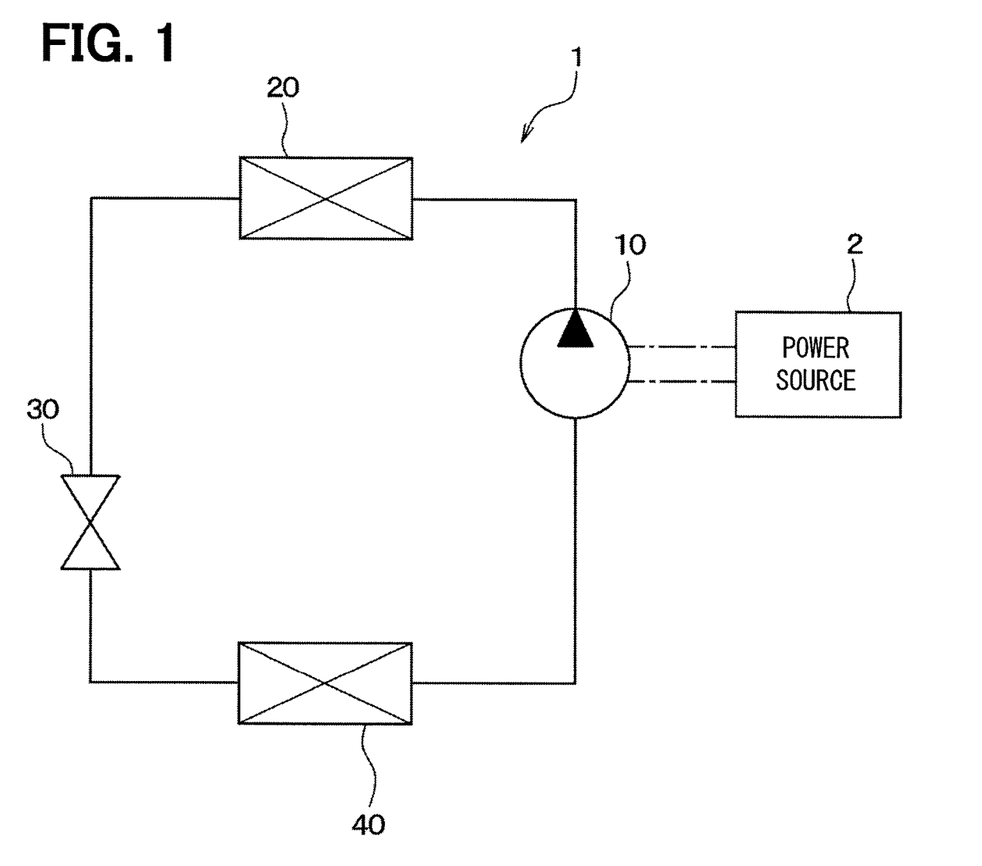
FIG. 1 is a schematic diagram illustrating a refrigerant cycle device regarding a first embodiment of the present disclosure.

As shown in FIG. 1, a refrigerant cycle device 1 has a compressor 10, a radiator 20, a decompressor 30, and an evaporating part (an evaporator) 40. These components are connected annularly with a pipe and configure a refrigerant circuit.

The compressor 10 is operated by an internal combustion engine that is a power source 2 for traveling a vehicle. When the power source 2 is stopped, the compressor 10 is also stopped. Incidentally, the power source 2 may be an electric motor. The compressor 10 draws refrigerant from the evaporator 40, compresses the drawn refrigerant, and discharges the drawn refrigerant toward the radiator 20. The radiator 20 cools high-temperature refrigerant. The radiator 20 is called a condenser. The decompressor 30 decompresses refrigerant cooled in the radiator 20. The evaporator 40 is a cooling heat exchanger absorbing heat from blown air that is to be blown into a passenger compartment such that refrigerant decompressed by the decompressor 30 is evaporated, and that the blown air is cooled.

Figure 2:
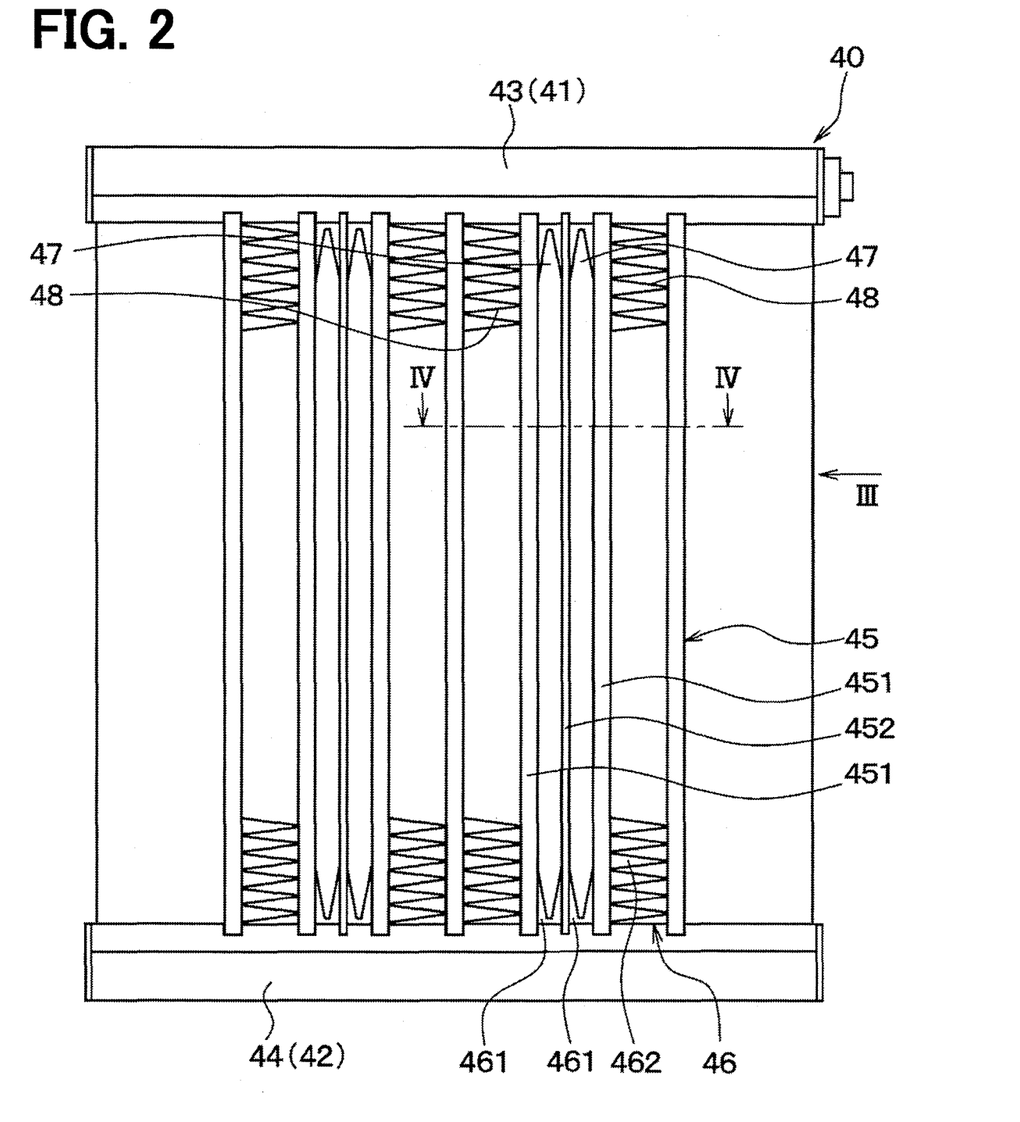
FIG. 2 is a schematic diagram illustrating an evaporator of the first embodiment that is viewed from an upstream side in a flow direction of air.
Figure 3:
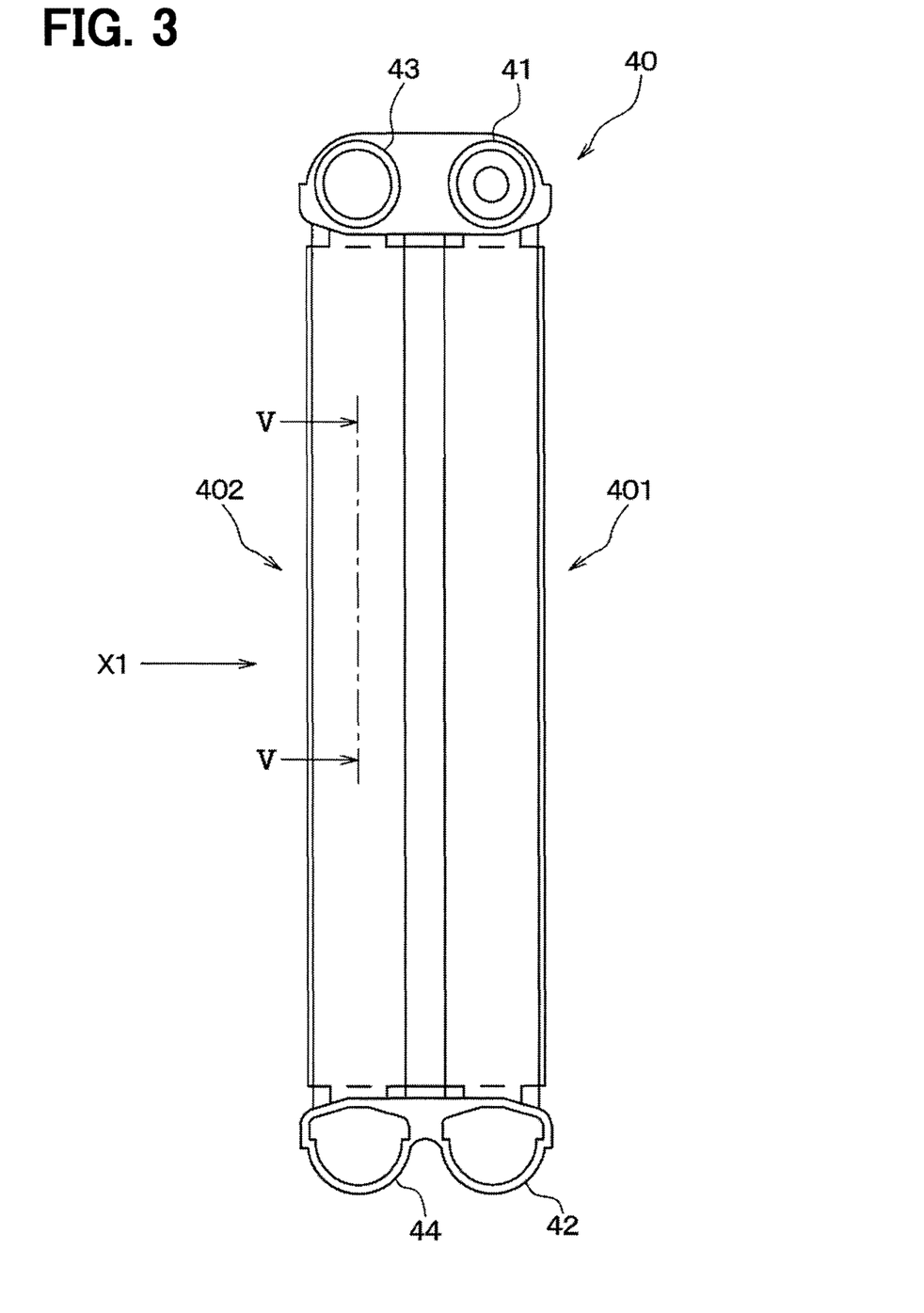
FIG. 3 is a side view of the evaporator that is viewed from a direction shown by an arrow III in FIG. 2.

As shown in FIGS. 2, 3, the evaporator 40 has header tanks 41, 42, 43, 44 arranged in pairs and refrigerant pipes 45 through which the header tanks arranged in pairs communicate with each other. An arrow X1 in FIG. 3 shows a flow direction of air. In FIG. 2, numerals 43, 44 show header tanks located at an upstream side in the flow direction of air, and numerals 41, 42 show header tanks located at a downstream side in the flow direction of air.

Figure 4:
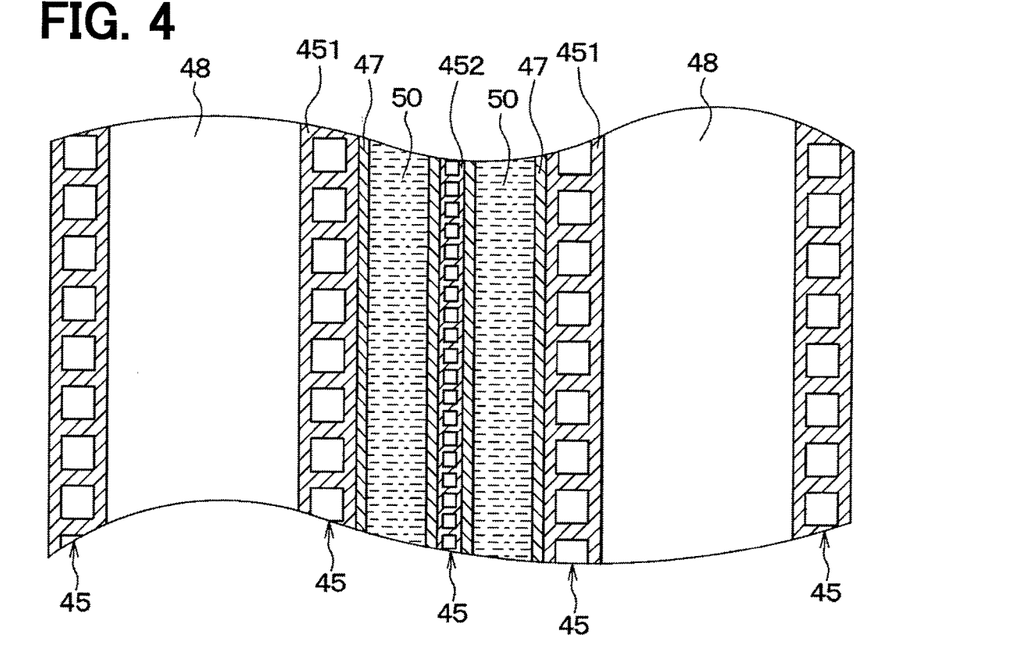
FIG. 4 is a cross-sectional view taken along a line IV-IV of FIG. 2.

The refrigerant pipe 45 has a refrigerant passage therein. Specifically, a cross-sectional shape of the refrigerant pipe 45 is a flat shape, and the refrigerant pipe 45 is a perforated pipe having plural refrigerant passages therein, as shown in FIG. 4. As shown in FIGS. 2, 3, the refrigerant pipe 45 extends straight from one end through an other end, and the refrigerant passages in the refrigerant pipe are also extend straight. The refrigerant pipes 45 are arranged along a gravity direction. The refrigerant pipe 45 is made of metal such as aluminum.

Each of the header tanks 41, 42, 43, 44 communicates with the one end or the other end of the refrigerant pipes 45 to distribute refrigerant to the refrigerant pipes 45 or to collect refrigerant flowing from the refrigerant pipes 45. The header tanks 41, 42, 43, 44 are made of metal such as aluminum.

Specifically, as shown in FIGS. 2, 3, a first header tank 41 and a second header tank 42 are arranged in pairs to be a specified distance away from each other and to be parallel with each other. The refrigerant pipes 45 are arranged between the first header tank 41 and the second header tank 42 to be distanced from each other. End portions of each of the refrigerant pipes 45 communicate with an inside of corresponding first header tank 41 and an inside of corresponding second header tank 42, respectively. The first header tank 41, the second header tank 42, and refrigerant pipes 45 disposed between the first header tank 41 and the second header tank 42 configure a first heat exchanging part 401.

Similarly, a third header tank 43 and a fourth header tank 44 are arranged in pairs to be a specified distance away from each other and to be parallel with each other. The refrigerant pipes 45 are arranged between the third header tank 43 and the fourth header tank 44 to be distanced from each other. End portions of each of the refrigerant pipes 45 communicate with an inside of corresponding third header tank 43 and an inside of corresponding fourth header tank 44, respectively. The third header tank 43, the fourth header tank 44, and refrigerant pipes 45 disposed between the third header tank 43 and the fourth header tank 44 configure a second heat exchanging part 402.

As a result, the evaporator 40 has the first heat exchanging part 401 and the second heat exchanging part 402 that are arranged in two-layers, as shown in FIG. 3. The second heat exchanging part 402 is located at an upstream side, and the first heat exchanging part 401 is located at a downstream side in the flow direction of air shown by the arrow X1.

An end portion of the first header tank 41 has an un-shown joint working as a refrigerant inlet. An inside of the first header tank 41 is partitioned into a first compartment and a second compartment by an un-shown partition plate that is disposed generally at a center of the inside of the first header tank 41 in a longitudinal direction of the first header tank 41. Correspondingly, the refrigerant pipes 45 are divided into a first group and a second group.

Refrigerant is supplied to the first compartment of the first header tank 41. The refrigerant is distributed from the first compartment to the refrigerant pipes 45 included in the first group. The refrigerant inflows into the second header tank 42 through the first group and are collected.

The refrigerant is distributed again from the second header tank 42 to the refrigerant pipes 45 included in the second group. The refrigerant inflows into the second compartment of the first header tank 41 through the second group. Thus, in the first heat exchanging part 401, a passage guiding the refrigerant to flowing in U-shape is provided.

An end portion of the third header tank 43 has an un-shown joint working as a refrigerant outlet. An inside of the third header tank 43 is partitioned into a first compartment and a second compartment by an un-shown partition plate that is disposed generally at a center of the inside of the third header tank 43 in a longitudinal direction of the third header tank 43.

Correspondingly, the refrigerant pipes 45 are divided into a first group and a second group. The first compartment of the third header tank 43 is located adjacent to the second compartment of the first header tank 41. The first compartment of the third header tank 43 communicates with the second compartment of the first header tank 41.

Refrigerant flows from the second compartment of the first header tank 41 into the first compartment of the third header tank 43. The refrigerant is distributed from the first compartment to the refrigerant pipes 45 included in the first group. The refrigerant inflows to the fourth header tank 44 through the first group and are collected. The refrigerant is distributed again from the fourth header tank 44 to the refrigerant pipes 45 included in the second group.

The refrigerant inflows into the second compartment of the third header tank 43 through the second group. Thus, in the second heat exchanging part 402, a passage guiding the refrigerant to flowing in U-shape is provided. The refrigerant in the second compartment of the third header tank 43 flows from a refrigerant outlet toward the compressor 10.

As shown in FIG. 2, the evaporator 40 has clearances 46 such that one clearance 46 is defined between the refrigerant pipes 45 adjacent to each other. The clearances 46 includes a clearance 461 in which a cold storage material case 47 is positioned and another clearance 462 in which an outer fin 48 is positioned. The clearance 461 of the clearances 46, in which the cold storage material case 47 is positioned, is a housing part housing the cold storage material, and the clearance 462 of the clearances 46, in which the outer fin 48 is positioned, provides an air passage.

Figure 5:
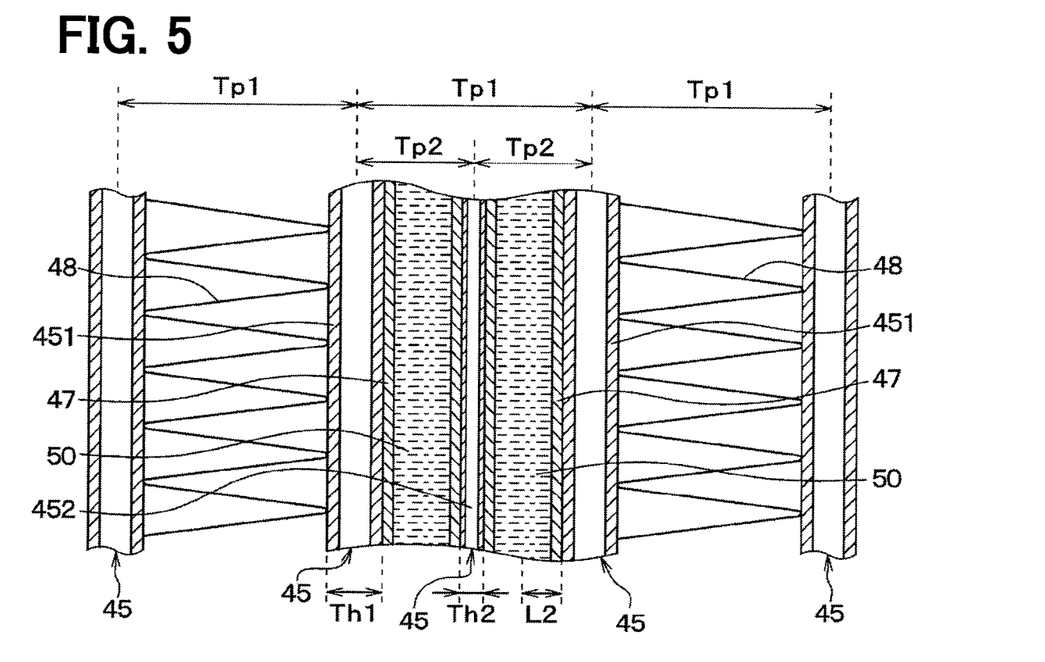
FIG. 5 is a cross-sectional view taken along a line V-V of FIG. 3.

The cold storage material case 47 therein houses a cold storage material 50 such as paraffin or water, as shown in FIGS. 4, 5. Specifically, the cold storage material case 47 is made of metal such as aluminum. The cold storage material case 47 is formed in a flat tube shape and closed by squashing the flat tube in a thickness direction at both sides of the tube in a longitudinal direction, such that a compartment to house the cold storage material therein is defined.

The cold storage material case 47 is coupled thermally with two of the refrigerant pipes 45 that are located at both sides of the cold storage material case 47. That is, the cold storage material case 47 is connected to the two of the refrigerant pipes 45 that are adjacent to the cold storage material case 47 through a bonding material such as a brazing material having a great thermal conductivity. The outer fin 48 is for promoting a heat exchange between refrigerant and the blown air that is to be blown into the passenger compartment. The outer fin 48 is connected to two of the refrigerant pipes 45 that are located adjacent to the outer fin 48 by a brazing material. As the outer fin 48, a corrugated fin is used. The corrugated fin has a curved shape formed in a manner that a thin metal plate made of aluminum or the like is curved in a wavelike fashion.

The cold storage material case 47 and the outer fin 48 are arranged in a specified pattern. Specifically, the outer fin 48, the refrigerant pipe 451, the cold storage material case 47, the refrigerant pipe 452, the cold storage material case 47, the refrigerant pipe 451, and the outer fin 48 are arranged in this order, as shown in FIGS. 4, 5.

In other words, the cold storage material case 47 is disposed in two of the clearances 461 of the clearances 46 that are adjacent to each other, as shown in FIG. 2. The refrigerant pipe 45 is interposed between the cold storage material cases 47. The refrigerant pipe 45 is located between the cold storage materials 50. The refrigerant pipe 45 interposed between the cold storage material cases 47 is directly in contact with the cold storage material cases 47. That is, refrigerant flowing in the refrigerant pipe 45 can exchange heat with the cold storage material 50 in the cold storage material case 47, without involving air, in a stacking direction of the refrigerant pipes 45. The cold storage material 50 in the cold storage material cases 47 disposed in at least two of the clearances 461 adjacent to each other is capable of exchanging heat with the refrigerant pipe partitioning at least the two of the clearances 461 adjacent to each other, without involving air, in the stacking direction of the refrigerant pipes 45.

Moreover, in the present embodiment, when a distance from a center of one of the refrigerant pipes 45 to a center of another one of the refrigerant pipes 45 in the stacking direction of the refrigerant pipes 45 is defined as a refrigerant pipe pitch, a refrigerant pipe pitch between two of the refrigerant pipes 45 adjacent to each other is varied depending on a member that is located between the two of the refrigerant pipes 45.

Specifically, as shown in FIG. 5, a refrigerant pipe pitch Tp2 between two of the refrigerant pipes 45 that are adjacent to each other and therebetween have the cold storage material 50 is shorter than a refrigerant pipe pitch Tp1 between two of the refrigerant pipes 45 that are adjacent to each other and therebetween have the outer fin 48.

Furthermore, the refrigerant pipe pitch Tp2 between the two of the refrigerant pipes 45 that are adjacent to each other and therebetween have the cold storage material 50 is one-half as long as the refrigerant pipe pitch Tp1 between the two of the refrigerant pipes 45 that are adjacent to each other and therebetween have the outer fin 48.

In other words, the refrigerant pipes 45 includes (i) the first refrigerant pipes 451 that are arranged one after another to be the first refrigerant pipe pitch Tp1 away from each other and (ii) the refrigerant pipe 452 that is arranged between the two of the first refrigerant pipes 451 adjacent to each other to be the second refrigerant pipe pitch Tp2 away from each of the two of the first refrigerant pipes 451 as shown in FIG. 5. The air passage is defined between another two of the first refrigerant pipes 451 adjacent to each other, and the outer fin 48 is disposed in the air passage.

One of the second refrigerant pipes 452 is disposed between the two of the first refrigerant pipes 451. The cold storage material case 47 is disposed between the second refrigerant pipe 452 and the two of the first refrigerant pipes located at both sides of the second refrigerant pipe 452. That is, two of the cold storage material cases 47 are disposed between the two of the first refrigerant pipes 451 adjacent to each other. The second refrigerant pipe pitch Tp2 is shorter than the first refrigerant pipe pitch Tp1 and is one-half as long as the first refrigerant pipe pitch Tp1.

Moreover, in the present embodiment, the second refrigerant pipe 452 located between the cold storage materials 50 adjacent to each other has a refrigerant pipe height Th2 that is an outer dimension in the stacking direction of the refrigerant pipes 45. The refrigerant pipe height Th2 is lower than a refrigerant pipe height Th1 of the first refrigerant pipe 451 that is in contact with the outer fin 48, as shown in FIG. 5.

In the next portion, an operation of the present embodiment will be described. The power source 2 operates the compressor 10 when a passenger requests an air conditioning, for example, a cooling. The compressor draws refrigerant from the evaporator 40, compresses the refrigerant, and discharge the refrigerant. The refrigerant discharged from the compressor 10 radiates heat in the radiator 20. The refrigerant from the radiator 20 is supplied to the evaporator 40 after being decompressed in the decompressor 30. The refrigerant cools the cold storage material case 47 and also cools air though the outer fin 48 while being evaporated in the evaporator 40.

When the vehicle is temporary stopped, the power source 2 is stopped to save energy consumption, and the compressor 10 is stopped. Subsequently, a cooling performance of refrigerant in the evaporator 40 gradually decreases. In the course of this process, the cold storage material 50 gradually radiates cold and cools air.

Then, heat of air is transferred to the cold storage material 50 through the outer fin 48, the refrigerant pipes 45, and the heat storage material cases 47. As a result, air can be cooled by the cold storage material 50 if the refrigerant cycle device 1 is temporary stopped. When the vehicle starts traveling again, the power source 2 operates the compressor 10 again. Therefore, the refrigerant cycle device 1 cools the cool storage material 50 again, and the cool storage material 50 recovers cold.

In the next portion, effects of the present embodiment will be described.

(1) In the evaporator 40 of the present embodiment, the cold storage material case 47 is disposed in two clearances 461, which are adjacent to each other, of clearances 46 that are defined between the refrigerant pipes 45 adjacent to each other. Accordingly, the evaporator 40 of the present embodiment has the refrigerant pipe 452 of which both sides in the stacking direction of the refrigerant pipes 45 provides the housing part housing the cold storage material 50. Thus, since cold is not transferred from refrigerant to air in a cold recovery of the refrigerant pipe 452, a supply amount of cold supplied from refrigerant to the cold storage material 50 can be increased as compared to a case that one of the both sides of the refrigerant pipe 45 is the air passage. As a result, according to the evaporator 40 of the present embodiment, a cold storage duration can be shortened.

(2) In the evaporator 40 of the present embodiment, the refrigerant pipe pitch Tp2 between the two of the refrigerant pipes 45 that are adjacent to each other and therebetween have the cold storage material 50 is shorter than a refrigerant pipe pitch Tp1 between the two of the refrigerant pipes 45 that are adjacent to each other and therebetween have the outer fin 48. Accordingly, a cold traveling distance from an outer surface of the refrigerant pipe 45 to a center of the cold storage material 50 is shortened, and a distance traveled by cold transferring from refrigerant to the cold storage material is shortened, as compared to a case that a refrigerant pipe pitch between the refrigerant pipes 45 adjacent to each other is fixed among all of the refrigerant pipes 45 in the evaporator. As a result, according to the evaporator 40 of the present embodiment, a cold storage duration can be shortened.

Figure 6:
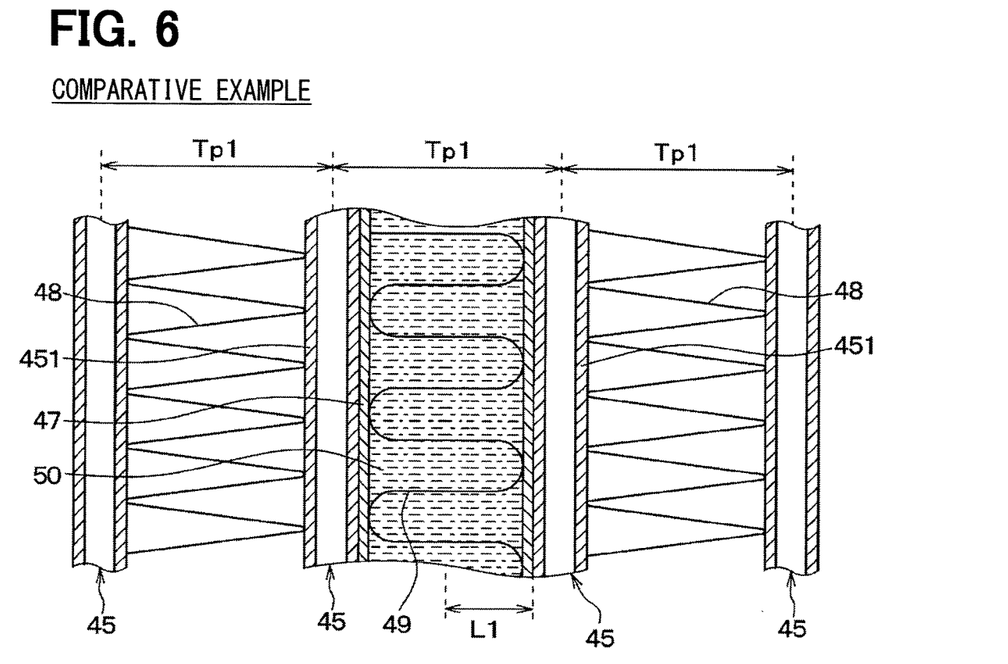
FIG. 6 is a cross-sectional view partially illustrating an evaporator regarding a comparative example.

(3) The evaporator 40 of the present embodiment will be compared with an evaporator of a comparative example shown in FIG. 6.

In the evaporator of the comparative example shown in FIG. 6, the refrigerant pipes 45 are configured by only the first refrigerant pipes 451, which are arranged to be the first refrigerant pipe pitch Tp1 away from each other, of the first and second refrigerant pipes 451, 452 described above. Then, the outer fin 48, the first refrigerant pipe 451, the cold storage material case 47, the first refrigerant pipe 451, and the outer fin 48 are arranged in this order. Thus, a refrigerant pipe pitch between two of the first refrigerant pipes 451 that therebetween have the cold storage material is equal to a refrigerant pipe pitch Tp1 between two of the first refrigerant pipes 451 that therebetween have the outer fin 48. The refrigerant pipe pitch Tp1 is the same as long as the refrigerant pipe pitch Tp1 of the present embodiment. Furthermore, the first refrigerant pipe 451 being in contact with the cold storage material case 47 has the air passage at a side of the first refrigerant pipe 451 that is opposite to the cold storage material case 47.

On the other hand, in the evaporator 40 of the present embodiment, the second refrigerant pipe 452 is further disposed between the two of the first refrigerant pipes 451, as compared to the evaporator of the comparative example shown in FIG. 6. The second refrigerant pipe 452 is arranged such that the second refrigerant pipe 452 and the two of the first refrigerant pipes are arranged to be a second refrigerant pipe pitch Tp2, which is shorter than the first refrigerant pitch Tp1, away from each other. Then, the cold storage material 50 is disposed between the second refrigerant pipe 452 and two of the first refrigerant pipes 451 that are located at the both sides of the second refrigerant pipe 452.

Thus, according to the evaporator 40 of the present embodiment, a cold traveling distance L2 from an outer surface of the first and second refrigerant pipes 451, 452 to a center of the cold storage material 50 can be shorter than a cold traveling distance L1 in the evaporator of the comparative example shown in FIG. 6, and thermal resistance between the refrigerant pipes 45 and the cold storage material 50 can be reduced.

Moreover, since the evaporator 40 of the present embodiment further has the second refrigerant pipe as compared to the evaporator of the comparative example shown in FIG. 6, the number of the refrigerant pipes increases, and a cross sectional area of whole of the refrigerant passages increases. Therefore, since a pressure loss of refrigerant in the refrigerant passage is reduced, and an evaporating temperature of the refrigerant decreases, a temperature difference between the refrigerant and the cold storage material in the cold recovery increases, and an amount of cold transferring from the refrigerant to the cold storage material increases.

Moreover, since the evaporator 40 of the present embodiment further has the second refrigerant pipe 452 disposed between the two of the first refrigerant pipes 451 that are located at the both sides of the cold storage material 50 as compared to the evaporator of the comparative example shown in FIG. 6, a contacting area between the cold storage material 50 and the refrigerant pipes per volume increases to double. Therefore, the supply amount of cold supplied from the refrigerant to the cold storage material 50 increases.

As a reason of the above points, according to the evaporator 40 of the present embodiment, the cold storage duration can be shortened.

Incidentally, in the evaporator of the comparative example shown in FIG. 6, an inner fin 49 is disposed in the cold storage material case 47. However, even if the inner fin 49 is disposed, a supply amount of cold per volume of the cold storage material does not change, and the cold storage duration may not be capable of being shortened in some cases.

Then, according to the evaporator 40 of the present embodiment, when the second refrigerant pipe 452 having a same volume as that of the inner fin 49, instead of the inner fin 49 of the evaporator of the comparative example shown in FIG. 6, the cold storage duration can be shortened without changing a volume of the cold storage material 50.

(4) In the evaporator 40 of the present embodiment, the refrigerant pipe pitch Tp2 between the two of the refrigerant pipes 45 that are adjacent to each other and that have the cold storage material 50 is one-half as long as the refrigerant pipe pitch Tp1 between the two of the refrigerant pipes 45 that are adjacent to each other and that have the outer fin 48.

Thus, an evaporator having no cold storage material 50 needs less design changes to mount the cold storage material 50, and the cold storage material 50 can be mounted easily. That is, when the cold storage material 50 is mounted in an evaporator having no cold storage material 50, the refrigerant pipes 45 (i.e., the second refrigerant pipes 452) and the cold storage material case 47 is further disposed at locations to which the cold storage materials are arranged without changing a refrigerant pipe pitch between refrigerant pipes dividing the air passages.

(5) In the evaporator 40 of the present embodiment, the refrigerant pipe height Th2 of the second refrigerant pipe 452 is lower than the refrigerant pipe height Th1 of the first refrigerant pipe 451.

Accordingly, a volume of the housing part housing the cold storage material increases, and the number of the cold storage material disposed in the evaporator 40 can be increase, as compared to a case that the refrigerant pipe height Th2 of the second refrigerant pipe 452 is equal to the refrigerant pipe height Th1 of the first refrigerant pipe 451.

Since the second refrigerant pipe 452 is for the cold recovery of the cold storage material 50, the refrigerant pipe height Th2 of the second refrigerant pipe 452 may be lower than the refrigerant pipe height Th1 of the first refrigerant pipe 451 as long as a refrigerant pipe height that is required to recover cold in the cold storage material is secured.

Second Embodiment

Figure 7:
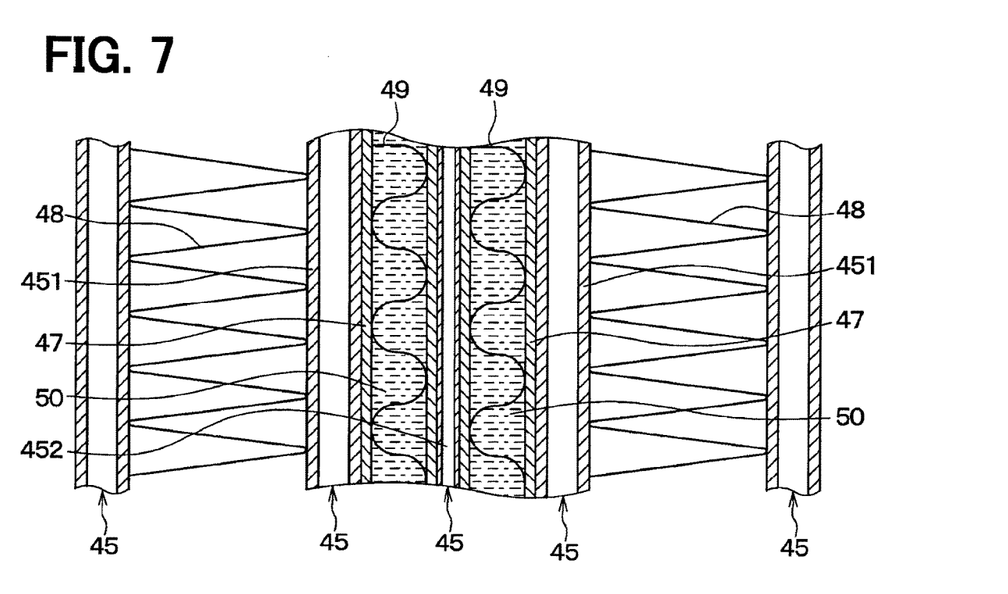
FIG. 7 is a cross-sectional view partially illustrating an evaporator regarding a second embodiment of the present disclosure.

According to the present embodiment, the inner fin 49 is further disposed in the cold storage material case 47 as shown in FIG. 7, as compared to the evaporator 40 of the first embodiment. According to this, similar effects that are similar to that of the first embodiment are produced.

Third Embodiment

Figure 8:
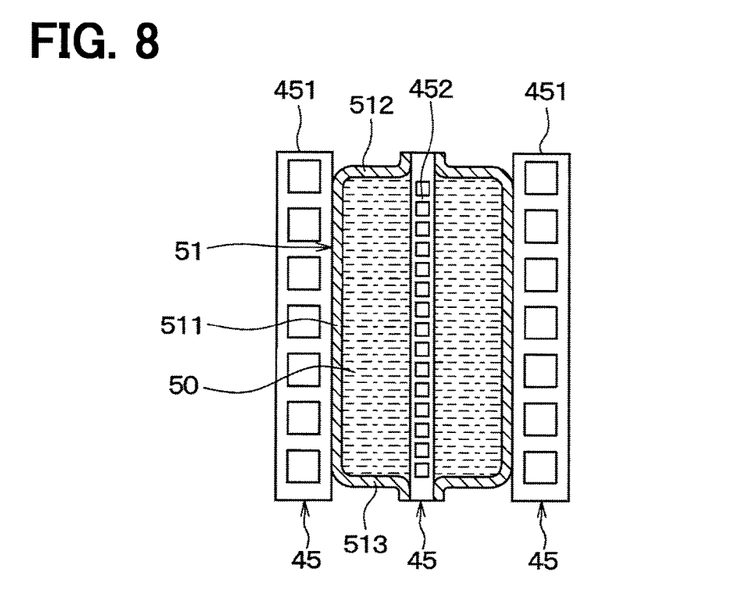
FIG. 8 is a cross-sectional view partially illustrating an evaporator regarding a third embodiment of the present disclosure.

In the first and second embodiments, the cold storage material case 47 is positioned between the two of the refrigerant pipes 45 adjacent to each other, and the cold storage material 50 is in contact with the two of the refrigerant pipes 45 through the cold storage material case 47. In contrast, in a third embodiment, the cold storage material 50 is directly in contact with an outer surface of the refrigerant pipes 45, as shown in FIG. 8.

According to the present embodiment, a plate shaped member 51 bent in a U-shape is located between the refrigerant pipes 45 adjacent to each other, in other words, between the first refrigerant pipe 451 and the second refrigerant pipe 452. The plate shaped member 51 is connected to one of the refrigerant pipes 45 adjacent to each other and has a main wall 511 that faces to an other of the refrigerant pipes 45 adjacent to each other and two sidewalls 512, 513 located at both sides of the main wall 511 that is interposed between the two sidewalls 512, 513. In the plate shaped member 51, the main wall 511 is connected to the first refrigerant pipe 451, and end portions of the two sidewalls 512, 513 are connected to the second refrigerant pipe 452. As a result, a cold storage material case is constituted by the second refrigerant pipe 452 and the main wall 511 and the two sidewalls 512, 513 of the plate shaped member 51. Thus, in the present embodiment, the refrigerant pipes 45 are used as a part of the cold storage material case.

According to the present embodiment, the following effect is further produced in addition to the effects provided by the first embodiment. That is, according to the present embodiment, since no wall of the cold storage material case is located between the second refrigerant pipe 452 and the cold storage material 50, an amount of the cold storage material housed between the refrigerant pipes adjacent to each other can be increased as compared with a case where a wall of a cold storage material case is disposed.

The refrigerant pipes 45 may be used as a part of the cold storage material case in other ways except for the way of the present embodiment.

Fourth Embodiment

Figure 9:
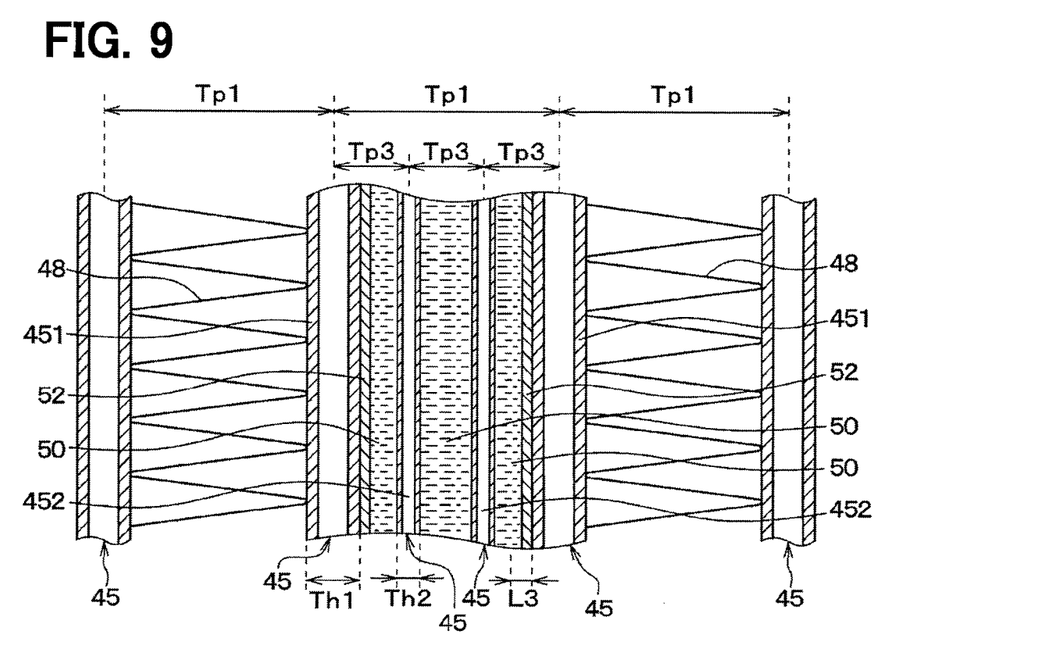
FIG. 9 is a cross-sectional view partially illustrating an evaporator regarding a fourth embodiment of the present disclosure.

In the above embodiments, one of the second refrigerant pipes 452 is positioned between the refrigerant pipes 451 adjacent to each other. In contrast, in the present embodiment, two of the second refrigerant pipes 452 are positioned as shown in FIG. 9.

The two of the second refrigerant pipes 452 are located a second refrigerant pipe pitch Tp3 away from the adjacent refrigerant pipes 45. The second refrigerant pipe pitch Tp3 is one third as long as the first refrigerant pipe pitch Tp1.

The cold storage material 50 is located between the two of the second refrigerant pipes 452 and between the two of the second refrigerant pipes 452 and the refrigerant pipes 45 located at both sides of the two of the second refrigerant pipes 452. That is, the cold storage materials 50 and the two of the second refrigerant pipes 452 are arranged between the first refrigerant pipes 451 adjacent to each other in the following order of the cold storage material 50, the second refrigerant pipe 452, the cold storage material 50, the second refrigerant pipe 452, and the cold storage material 50. Accordingly, the cold storage material 50 is disposed between the second refrigerant pipe 452 and the first refrigerant pipe 451 and between the second refrigerant pipe 452 and the second refrigerant pipe 452.

Figure 10:
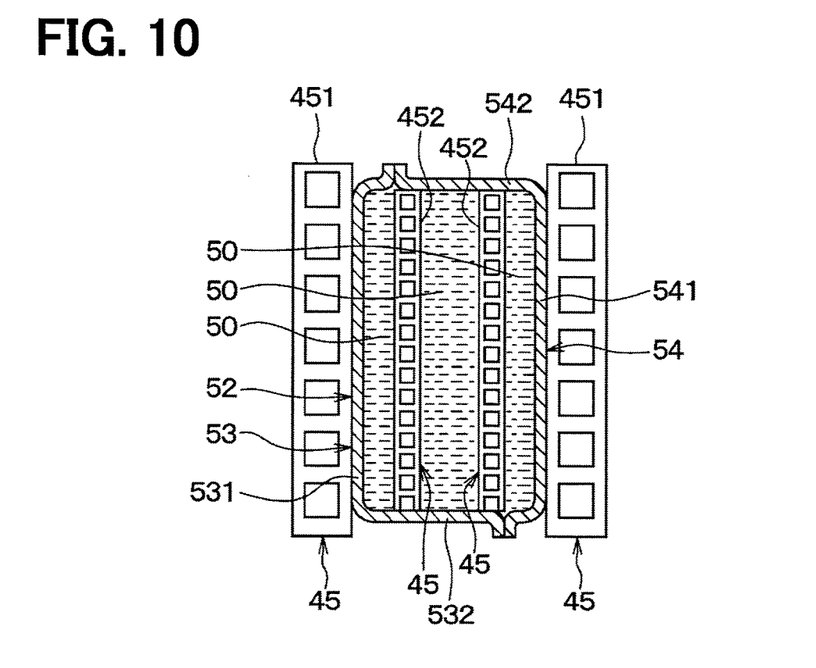
FIG. 10 is a cross-sectional view partially illustrating the evaporator regarding the fourth embodiment.

Furthermore, as shown in FIG. 10, the cold storage material 50 is housed between the first refrigerant pipes 451 adjacent to each other on a condition of being directly in contact with an outer surface of the second refrigerant pipes 452.

Specifically, one cold storage material case 52 is located between the first refrigerant pipes 451 adjacent to each other. The cold storage materials 50 and the second refrigerant pipes 452 are on a condition of being housed in the cold storage material case 52 in the following order of the cold storage material 50, the second refrigerant pipe 452, the cold storage material 50, the second refrigerant pipe 452, the cold storage material 50.

The cold storage material case 52 is formed by coupling the first and second plate shaped members 53, 54 to have a cylindrical shape. The first and second plate shaped members 53, 54 are bent to have generally L-shape in cross-section. The first and second plate shaped members 53, 54 have main walls 531, 541 connected to the first refrigerant pipes 451 and two sidewalls 532, 542 connected to the main walls 531, 541. The cold storage material case 52 is sealed gas tightly in a manner that end portions of the first and second plate shaped members 53, 54 in the longitudinal direction of the refrigerant pipes 45 are connected to the header tanks or that.

The present embodiment produces similar effects that are similar to that of the first embodiment and further produces the following effect.

According to the present embodiment, since a cold traveling distance L3 from refrigerant to the cold storage material is shorter than the cold traveling distance L2 of the first embodiment, the cold storage duration can further be shortened.

The number of the second refrigerant pipes 452 disposed between the first refrigerant pipes 451 adjacent to each other may be more than or equal to three. In this case, the second refrigerant pipe pitch is 1/n as long as the first refrigerant pipe pitch Tp1. The n is the number of the cold storage materials 50 arranged one after another between the first refrigerant pipes 451 adjacent to each other. The number of the cold storage materials 50 arranged one after another is equal to one plus the number of the second refrigerant pipes 452 disposed between the first refrigerant pipes 451 adjacent to each other.

In the present embodiment, similar to the first embodiment, the cold storage material case 47 may be disposed between the second refrigerant pipe 452 and the first refrigerant pipe 451 and between the second refrigerant pipe 452 and the second refrigerant pipe 452, respectively. However, in such a case, a capacity that is capable of housing the cold storage material 50 decreases due to the wall of the cold storage material case 47.

Then, in the present embodiment, since the cold storage material 50 is housed between the first refrigerant pipes 451 adjacent to each other on a condition of being directly in contact with the outer surface of the second refrigerant pipe 452, an amount of the cold storage material 50 housed between the first refrigerant pipes 451 adjacent to each other can be increased.

Fifth Embodiment

Figure 11:
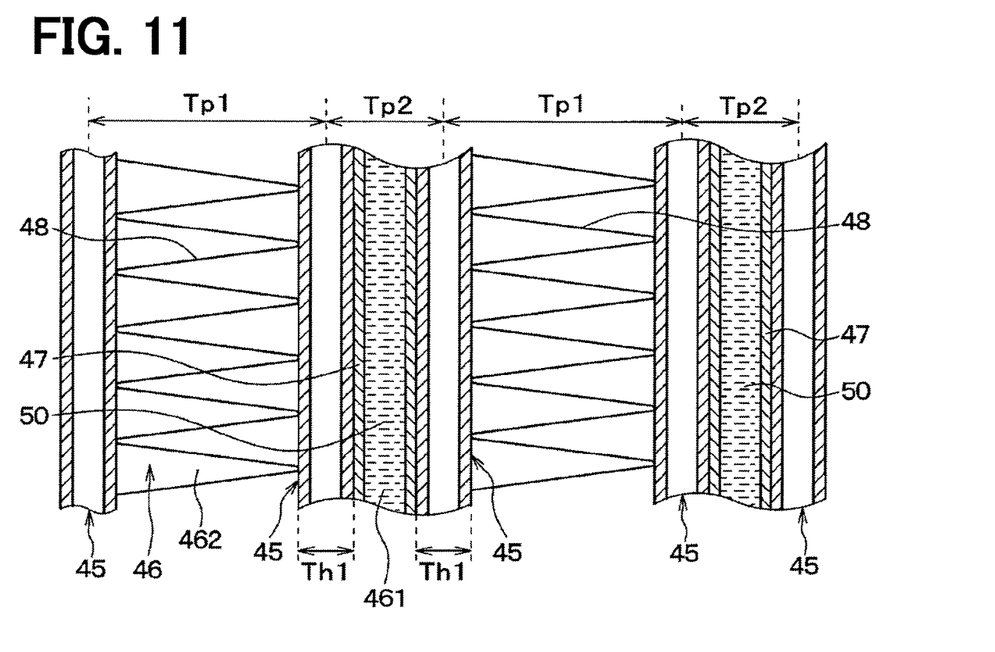
FIG. 11 is a cross-sectional view partially illustrating an evaporator regarding a fifth embodiment of the present disclosure.

In the above embodiments, the cold storage material 50 is disposed in the clearances 46 that are arranged adjacent to each other and are included in the clearances 46 defined between the refrigerant pipes 45 adjacent to each other. In the present embodiment, as shown in FIG. 11, the cold storage material 50 is not disposed in the clearances 46 adjacent to each other.

That is, in the present embodiment, the outer fin 48, the refrigerant pipe 45, the cold storage material case 47, the refrigerant pipe 45, the outer fin 48, the refrigerant pipe 45, the cold storage material case 47 are arranged in this order. In other words, the outer fin 48 and the cold storage material case 47 are arranged alternately with respect to the clearances 46 of the evaporator 40. The clearances 461 that is the housing part housing the cold storage material 50 and the clearances 462 providing the air passages are arranged alternately.

The refrigerant pipe height Th1 of all of the refrigerant pipes 45 included in the evaporator 40 is fixed.

Furthermore, the two of the refrigerant pipes 45 adjacent to each other and therebetween having the cold storage material 50 are the refrigerant pipe pitch Tp2 away from each other, and the refrigerant pipe pitch Tp2 is smaller than the refrigerant pipe pitch Tp1 between the two of the refrigerant pipes 45 adjacent to each other and therebetween having the outer fin 48.

Thus, the present embodiment provides the effect (2) described in the first embodiment.

Other Embodiment (1) Although the refrigerant pipe height Th2 of the second refrigerant pipes 452 is lower than the refrigerant pipe height Th1 of the first refrigerant pipes 451 in the first to fourth embodiments, the refrigerant pipe height Th2 may be equal to the refrigerant pipe height Th1.

(2) Although the second refrigerant pipe pitch Tp2, Tp3 is 1/n as long as the first refrigerant pipe pitch Tp1 in the first to fourth embodiments, it is not necessary to be 1/n as long as the second refrigerant pipe pitch Tp2, Tp3 is shorter than the first refrigerant pipe pitch Tp1.

(3) Although the second refrigerant pipe pitch Tp2 is shorter than the first refrigerant pipe pitch Tp1 in the first to fourth embodiments, the second refrigerant pipe pitch Tp2 may be equal to the first refrigerant pipe pitch Tp1.

(4) Although the outer fin 48 is located in the clearance 462, which provides the air passage, of the clearances defined between the refrigerant pipes 45 adjacent to each other, the outer fin 48 may be omitted.

(5) Although a refrigerant route in the evaporator 40 is a left-right U-turn type in the above embodiments, the present disclosure can be applied to an evaporator having another refrigerant route.

(6) Although the cold storage heat exchanger of the present disclosure is applied to the refrigerant cycle device for the vehicle air conditioner in the above embodiments, the present disclosure is not limited to this, and, for example, the cold storage heat exchanger may be applied to a refrigerant cycle device for a water heater or the like.

The invention claimed is:

1. A cold storage heat exchanger comprising:
    refrigerant pipes each of which has a refrigerant passage therein, the refrigerant pipes arranged so as to be distanced from each other with clearances therebetween; and
    a cold storage material disposed in at least one of the clearances, wherein
    at least an another one of the clearances provides an air passage, and
    the heat storage material is disposed in at least two of the clearances arranged adjacent to each other.

2. The cold storage heat exchanger according to claim 1, wherein
    when a distance from a center of one of the refrigerant pipes to a center of another one of the refrigerant pipes is defined as a refrigerant pipe pitch, a refrigerant pipe pitch between two of the refrigerant pipes that are adjacent to each other and therebetween have the cold storage material is shorter than a refrigerant pipe pitch between two of the refrigerant pipes that are adjacent to each other and therebetween have the air passage.

3. The cold storage heat exchanger according to claim 2, wherein
    when the number of the cold storage material arranged one after another is n, the refrigerant pipe pitch of the two of the refrigerant pipes that are adjacent to each other and therebetween have the cold storage material is 1/n times as long as the refrigerant pipe pitch between the two of the refrigerant pipes that are adjacent to each other and therebetween have the air passage.

4. The cold storage heat exchanger according to claim 1, wherein
    the refrigerant pipes each of which is located between the cold storage materials adjacent to each other have a refrigerant pipe height that is a dimension in the stacking direction of the refrigerant pipes, and the refrigerant pipe height is lower than a refrigerant pipe height of the refrigerant pipes being in contact with the air passage.

5. The cold storage heat exchanger according to claim 1, wherein
    the cold storage material disposed between the clearances adjacent to each other is capable of exchanging heat with the refrigerant pipes that define at least two of the clearances adjacent to each other, without involving air, in a stacking direction of the refrigerant pipes.

6. A cold storage heat exchanger comprising:
    refrigerant pipes each of which has a refrigerant passage therein, the refrigerant pipes arranged so as to be distanced from each other with clearances; and
    a cold storage material disposed in at least one of the clearances, wherein
    at least an another one of the clearances provides an air passage, and
    when a distance from a center of one of the refrigerant pipes to a center of another one of the refrigerant pipes is defined as a refrigerant pipe pitch, a refrigerant pipe pitch between two of the refrigerant pipes that are adjacent to each other and therebetween have the cold storage material is shorter than a refrigerant pipe pitch between two of the refrigerant pipes that are adjacent to each other and therebetween have the air passage.

7. A cold storage heat exchanger comprising:
    refrigerant pipes each of which has a refrigerant passage therein, the refrigerant pipes are arranged so as to be distanced from each other; and
    a heat storage material arranged between the refrigerant pipes adjacent to each other, wherein
    when a distance from a center of one of the refrigerant pipes to a center of another one of the refrigerant pipes is defined as a refrigerant pipe pitch:
    the refrigerant pipes includes first refrigerant pipes that are arranged one after another to be a first refrigerant pipe pitch away from each other; and
    the refrigerant pipes includes more than or equal to one of a second refrigerant pipe that is arranged between a pair of the first refrigerant pipes adjacent to each other such that the second refrigerant pipe and the pair of the first refrigerant pipes are arranged to be a second refrigerant pipe pitch that is shorter than the first refrigerant pitch away from each other,
    an air passage is defined between an another pair of the first refrigerant pipes adjacent to each other, and
    the cold storage material is disposed between the second refrigerant pipe and two refrigerant pipes that are located on both sides of the second refrigerant pipe, and the second refrigerant pipe is located between the cold storage material.

8. The cold storage heat exchanger according to claim 7, wherein
the second refrigerant pipe is capable of exchanging heat with the cold storage material disposed between the second refrigerant pipe and the two of the refrigerant pipes that are located on the both sides of the second refrigerant pipe, without involving air, in a stacking direction of the refrigerant pipes.

* * * * *